UNITED STATES PATENT OFFICE.

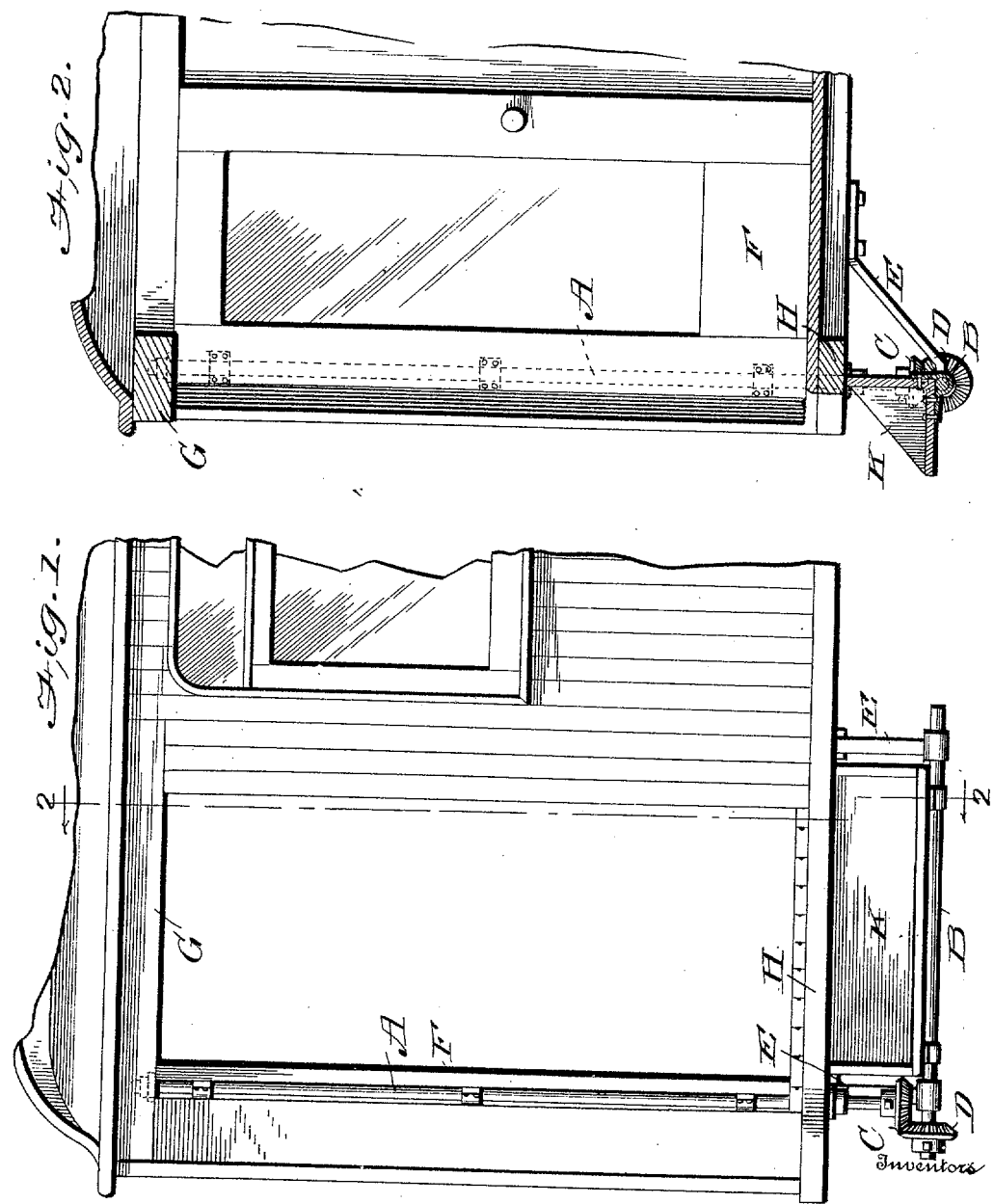

NELSON L. REEVES AND JAMES B. SHANE, OF CHICAGO, ILLINOIS.

FOLDING CAR-STEP.

No. 868,482.　　　　Specification of Letters Patent.　　　　Patented Oct. 15, 1907.

Application filed March 14, 1907. Serial No. 362,256.

*To all whom it may concern:*

Be it known that we, NELSON L. REEVES and JAMES B. SHANE, citizens of the United States, residing at Chicago, in the county of Cook and State of Illinois, have invented certain new and useful Improvements in Folding Car-Steps, of which the following is a specification.

This invention is a folding or turning car step designed for the use of street and railway cars and operated by connection with the door of a vestibule, so that when the door is opened the step will be turned to proper position to enable a person to enter or alight from the car, and when the door is closed the step will be turned up out of useful position, thereby preventing any person from standing upon the step, and also preventing the lodgment of rain or snow upon the step.

The invention is illustrated in the accompanying drawings, in which

Figure 1 is a side elevation of the invention. Fig. 2 is a vertical section on the line 2—2 of Fig. 1.

Referring specifically to the drawings, A indicates an upright shaft or bar, which may conveniently be made of gas pipe or the like, and which extends from the top G of the door frame, at the edge or side of the doorway and down through the sill H of the door frame. The door F is securely fastened to this bar or shaft so that when the door is swung the shaft will be turned accordingly.

The shaft extends through the sill H and carries at its lower end a bevel gear C which meshes with a gear D on a horizontal shaft B which extends along under the door sill and parallel thereto, and is supported by hangers and braces E depending from the platform. The step, K, is rigidly fixed to the shaft B, so as to turn therewith.

The gearing is such that when the door is opened the step K is turned out or down in position for use. When the door is closed the shafts are turned and the step is swung up and in under the car platform. It is therefore impossible for any one to use or ride upon the step when the door is closed. By application to cars of various kinds injuries to persons riding on the steps, or getting on or off the steps while the car is in motion, may be prevented, since the door will be under the control of the conductor, and the step will not be in position for use until he opens the door.

I claim:

1. The combination of a swinging car door having a pivot extending below the platform, a turning step thereunder, and gearing between the lower end of the pivot and the step, whereby the step is turned into or out of position for use when the door is opened or closed.

2. The combination of a car door, an upright shaft at the side of the door way, on which shaft the door is hung, a turning step under the doorway, a horizontal shaft on which the step is mounted, and gearing between said shafts, whereby when the door is opened the step is turned down to useful position, or vice versa.

In testimony whereof we affix our signatures, in presence of two witnesses.

NELSON L. REEVES.
　　　　　　　　　　　　JAMES B. SHANE.

Witnesses:
　NELLIE FELTSKOG,
　H. G. BATCHELOR.